United States Patent

[11] 3,592,974

[72] Inventor Donald V. DiMassimo
Edison Township, Middlesex County, N.J.

[21] Appl. No. 819,819
[22] Filed Apr. 28, 1969
[45] Patented July 13, 1971
[73] Assignee G-V Controls Inc.
Livingston Township, N.J.

[54] AUTOMATIC DIALING APPARATUS
6 Claims, 8 Drawing Figs.

[52] U.S. Cl. .......... 179/90 B, 179/90 BD
[51] Int. Cl. .......... H04m 1/45
[50] Field of Search .......... 179/90 B, 90 K84 VF, 5, 90 BB, 90 BD

[56] References Cited

UNITED STATES PATENTS

| | | | |
|---|---|---|---|
| 3,466,395 | 9/1969 | Prins | 179/2 |
| 3,342,943 | 9/1967 | Aumuller et al. | 179/18 |
| 2,672,523 | 3/1954 | Dunlap | 179/81 |

*Primary Examiner*—Kathleen H. Claffy
*Assistant Examiner*—Tom D Amico
*Attorney*—Charles T. Jacobs

ABSTRACT: The invention is addressed to a system comprising preprogrammable apparatus, having terminals through which energy may be supplied to that apparatus to energize it, effective when energized to generate a coded series of spaced signals, a telephone line, and circuit means for connecting the terminals across that line. With that system there are combined a normally nonconductive transistor whose collector-emitter path is serially included in the circuit means above mentioned, and a means controlled by said apparatus and effective upon the energization thereof and until the conclusion of the ensuing series of signals to supply current to the base-emitter path of the transistor during the signal-preceding intervals but to open the circuit means during the signals. Energization of the apparatus is initiated by means, independent of said apparatus, for supplying a temporary initial current from the telephone line to said base-emitter path.

INVENTOR
DONALD V. DI MASSIMO
BY [signature]
ATTORNEY

INVENTOR
DONALD V. DI MASSIMO
BY [signature]
ATTORNEY

PATENTED JUL 13 1971 3,592,974

SHEET 3 OF 4

INVENTOR
DONALD V. DI MASSIMO
BY [signature]
ATTORNEY

INVENTOR
DONALD V. DI MASSIMO
BY Charles T. Jacobs
ATTORNEY

AUTOMATIC DIALING APPARATUS

This invention relates to Automatic Dialing Apparatus, particularly such apparatus which is preprogrammable for the dialing of a predetermined telephone address or of any selected one of a plurality of predetermined such addresses.

Automatic dialing apparatus is known and is in current use. Other than for purely mechanical forms, which are inherently subject to severe limitations, such apparatus requires an electrical power source for its energization. At some locations, importantly including many where emergency telephone service is required, no electric power lines are available; in such instances recourse has sometimes been had to the use of storage batteries trickle-charged from the line while it is not in use and its voltage is therefore high, but this tends to be less than wholly satisfactory. A far preferable approach would be the powering of the apparatus directly from the telephone line at the time of its use—an approach of great convenience, and of enhanced dependability even at locations where electric power lines are available. With normal telephone-station arrangements, however, the loading of the in-use line by the network within the station renders the voltage available from the line insufficient for this purpose—all the more so, the greater be the length and thus the resistance of the line.

It is an object of the invention to provide automatic dialing apparatus which may be energized from the telephone line. It is an object to provide such apparatus which may be so energized even from lines of the highest resistance encountered within the limits for other operating reasons have been established for telephone service.

In general in automatic dialing apparatus there are provided means for generating discrete signals transmissible over the line, and a control means actuable to direct the operation of that generating means to result in the generation thereby of a coded series of spaced signals. The control means may have a pair or terminals through which DC energy may be supplied to it to energize it. The line, within a period comprising the duration of the series of signals, may be essentially freed of station-network loading at least during substantial nonsignal intervals occurring in that period—and during those intervals there may be effected a low-resistance current-conducting connection of the above mentioned control means terminals across the line, whereby during those intervals both to energize the control means and to provide thereby a substitute loading of the line. That loading, being substantially lighter than that imposed by the station network, results in a line voltage ample for the energization.

Additionally, during the signals there may be supplied to the above mentioned terminals supplementary DC energy derived from the line to then sustain the control means energization. Further, during the intervals the line current may be deliberately maintained well above the minimum required for proper functioning of the central office equipment.

More specifically, according to the invention there is employed a system comprising (a) preprogrammable apparatus, having a pair of terminals through which energy may be supplied to that apparatus to energize the same, effective when energized to generate a coded series of signals each preceded by a nonsignal interval, (b) means connected with that apparatus for causing an energization thereof, once effected, to persist for at least the duration of a signal, (c) a telephone line, and (d) circuit means for connecting those terminals across that telephone line. With that system there are combined (1) a normally nonconductive transistor of which the collector-emitter path is serially included in such circuit means, (2) means, connected with such circuit means and controlled by that apparatus, effective upon the energization of that apparatus and until the conclusion of the ensuing series of signals to supply current to the base-emitter path of that transistor during the intervals preceding those signals but to open the circuit means during those signals, and (3) means for initiating an energization of that apparatus, comprising means independent of that apparatus for supplying a temporary initial current from the telephone line to the above mentioned base-emitter path. The system may be associated with a telephone station which includes a station network connected across the telephone line during communication from the station thereover; means responsive to the operation of the foregoing element (3) may disconnect the station network from the telephone line until the conclusion of the series of signals, or at least during the signal-preceding intervals—or, in other terms, such means may free the telephone line of station-network loading until the conclusion of the series of signals, or at least during the signal-preceding intervals.

Further objects and features of the invention will more fully appear from the following description and the appended claims.

In that description reference is had to the accompanying drawings, in which.

Figure 1:
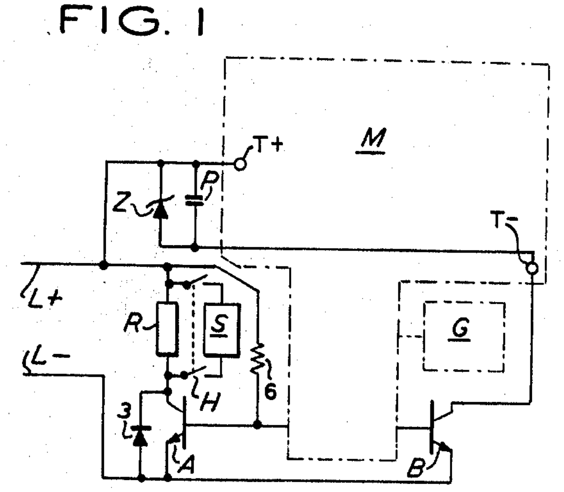
FIG. 1 is a simplified schematic diagram of an embodiment of the invention for pulse dialing.

FIG. 1 is a simplified schematic diagram of an embodiment of my invention for pulse, or "rotary," dialing. Therein L and L– denote the telephone line, DC-energized and of substantial but unstandardized resistance, and S denotes a telephone station of the usual pulse-dialing variety, including the usual station network, handset and rotary dialing mechanism; station S is connected to the line through the usual two-pole hook switch H, across the line side of which the ringer R is connected. In accordance with my invention the connection of the station to one side of the line (typically L–) is made through a switching transistor A (typically an NPN), which in the FIG. 1 case is maintained conductive (whether or not the hook switch is closed)—excepting during the dialing period hereinafter mentioned—by the flow of a small base current thereto through a resistor 6; the collector-emitter circuit of this is transistor may be shunted by a reversely poled diode 3 in order to provide full access for alternating ringing currents to the ringer R.

In FIG. 1, G denotes a signal generator (typically electronic), and M denotes an electrically energizable control means (also typically electronic) with which the signal generator is connected and which is actuable to direct the operation of the signal generator in the manner stated above. The control means M is provided with a pair of energy-input terminals T+ and T–, and is energized by the supply of direct current to those terminals; one (typically T+) of those terminals is connected (in FIG. 1, directly) to the appropriate side of the line, and the other is connected to the other side of the line through a switching transistor B (typically an NPN). The transistor B is nonconductive—excepting at certain times during the dialing period, next dealt with.

The dialing period is one comprising the duration of the series of signals to be dialed, and a short preceding nonsignal interval—and it of course includes the nonsignal intervals between the successive signals. During the dialing period the control means M renders the transistor A nonconductive, so that A then acts to free the line of loading by the station network within S. During the nonsignal intervals occurring in the dialing period the control means M renders the transistor B conductive, so that B then becomes a means effecting a low-resistance current-conducting connection of the energy-input terminals T+ and T− across the line—achieving, during those intervals, the results that the control means M is energized and that by such energizing there is provided a substitute loading of the line. Across the terminals T+ and T− there may be connected a capacitor P, which during the nonsignal intervals is maintained charged from the line, and during the signals themselves releases DC energy to the terminals to then sustain the energization of the control means; the capacitor P thus functions during the signals to supply to the terminals supplementary DC energy derived from the line.

With readily available components and techniques the energization of the control means may be accomplished with a voltage across the terminals T+ and T− in the 10 to 7 volt range, and with a sustained current flow of appreciably less than 10 milliamperes. Such energization need impose on the line, during the nonsignal intervals, a loading no more than that which would be imposed by a resistor of the very general order of 1,000 ohms. This is a many times lighter loading than is imposed by the typical station network (whose effective DC resistance, though a function of current, is always less than 200, and often less than 100, ohms), and assures the availability of ample voltage for the energization of M even with lines of the highest (typically about 2,500 ohms) resistance commercially encountered.

Indeed, on high-resistance lines it could, in the absence of a suitable counteractive, risk the fall of the line current during the intervals to less than then required for proper functioning of the central office equipment. A suitable counteractive is the connection across the terminals T+ and T− of a Zener diode Z having a breakdown voltage of, for example, 10 volts; this acts to maintain the current in even the high-resistance line case well above the required minimum.

Signals in pulse dialing are of course impressed on the line in the form of interruptions of the loading of the line. Since in the system of FIG. 1 the dialing period loading is the substitute loading referred to above (augmented by that provided by the Zener diode Z and, transiently only, by capacitor P), it is that loading which is to be interrupted. Transistor B, which during the nonsignal intervals within the dialing period connects that loading across the line, interrupts it during the signals generated by G, thus serving to impress those signals on the line.

Figure 3:
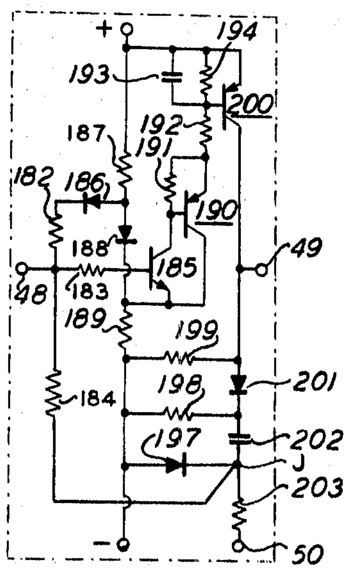
FIG. 3 is a schematic diagram of a timer such as may be used in the apparatus of FIG. 2.
Figure 4:
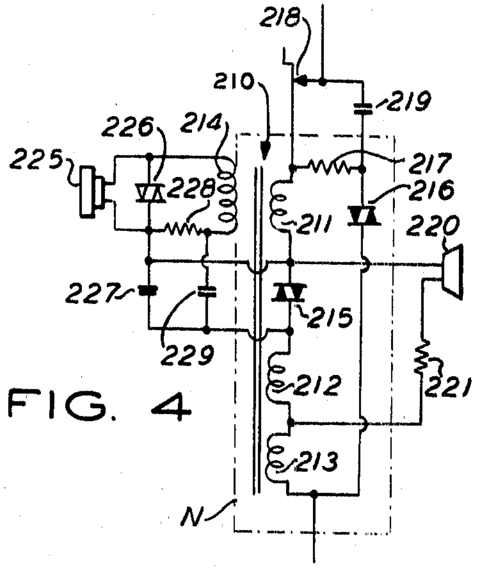
FIG. 4 is a schematic diagram of a typical telephone station such as undetailedly shown in FIG. 2.
Figure 2:
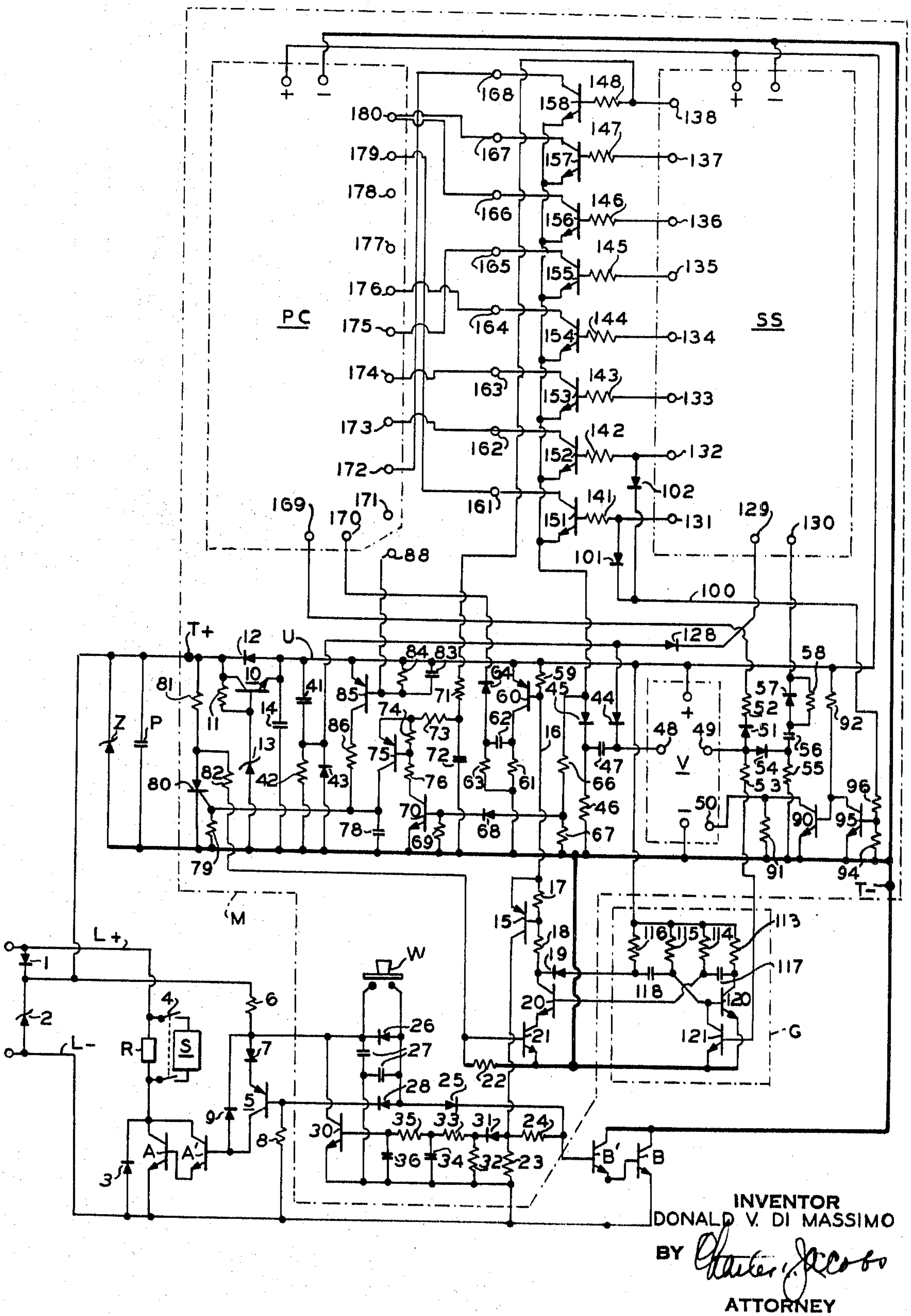
FIG. 2 is a more complete diagram of the apparatus of FIG. 1.

FIG. 2, supplemented by FIGS. 3 and 4, is a more complete diagram of the apparatus of FIG. 1. The station S, hook switch H, ringer R, transistor A and diode 3 appear in the same relationship to the line as in FIG. 1. The connection of T+ to L+ in FIG. 2 is shown as made through a diode 1, L+ being connected to the anode, and T+ (as well as the upper end of resistor 6) to the cathode, of that diode; that diode, present for protective purposes, of course poses no significant interference to flow of direct current from L+ to T+ (or to 6). A protective Zener diode 2 having a breakdown voltage of, for example, 200 volts may be connected from the cathode of diode 1 to conductor L−.

The transistor A is shown in FIG. 2 as driven by a transistor A′ (the two being in well-known Darlington arrangement), the small current through resistor 6 being supplied to the base of A′ to maintain both A′ and A conductive. That supply is shown as effected through a diode 7 and the emitter-collector path of a PNP transistor 5—the base of 5, in order to maintain that transistor normally conductive, being connected to conductor L−through a resistor 8, and a reversely poled diode 9 being shunted from the base of A′ to junction between 6 and 7. FIG. 2 shows the transistor B in the same relationship to conductor L− and terminal T− as in FIG. 1; that transistor may be driven by the transistor B′ (the two being in Darlington arrangement). FIG. 2 also shows the capacitor P and the Zener diode Z connected across the terminals T+and T−as in FIG. 1.

Attention may now be directed to the control means M. This contains a pushbutton switch W whose temporary closure is arranged to actuate the control means, which among other things thereupon promptly renders transistors A′ and A nonconductive and renders transistors B′ and B conductive. To render the former nonconductive during the temporary closure of W one side of that switch may be connected to the 6—7 junction and the other side may be connected through a diode 28 to the base of transistor 5; switch W may be shunted by a reversely poled diode 26, and each side of the switch may be bypassed to L−through a small capacitor 27. The result of these connections is that during switch closure the current previously flowing through diode 7 and the emitter-base path of transistor 5 will be diverted through the diode 28, causing transistor 5 and transistors A′ and A to become nonconductive and thereby freeing the telephone line of the loading imposed by the station S.

To render B′ and B conductive during the temporary closure of switch W the diode 28 side of the switch may be connected through a diode 25 to the base of transistor B′; during the switch closure current will flow from conductor L+through diode 1, resistor 6, the switch, diode 25 and the base-emitter path of B′, causing B′ and B to become conductive. This establishes a current conducting connection of terminals T+ and T− across the telephone line and, subject to a small delay imposed by the time required for the charging of capacitor P, initiates an energization of the control means M.

There may next be described the arrangements by which the nonconductivity of transistors A′ and A and the conductivity of transistors B′ and B are caused to survive the reopening of switch W. Preparatory to such description it is convenient first to note that, when the control means is energized, most of its subdivisions receive their energization by intracontrol means current flow to terminal T−from a conductor U, which is turn is supplied with current from terminal T+through a voltage regulator formed by an NPN transistor 10 and a Zener diode 13 having a breakdown voltage of, for example, about 7 ½ volts. The collector of 10 is connected to the terminal T+, the emitter of 10 to the conductor U, and the Zener diode 13 between the base of 10 and terminal T−; a resistor 11 is connected from collector to base of the transistor 10 to supply current to the Zener diode, a reversely poled diode 12 may be connected from emitter to collector of the transistor, and a small capacitor 14 may bypass the conductor U to T−. The effect of the regulator is to limit the potential between U and T−to a value of about 7 volts.

Through a path including a conductor 16 there may be connected to conductor U the emitter of a PNP transistor 15 whose base-emitter path is shunted by a resistor 17 and whose base is connected, through resistor 18 and the serially arranged collect or emitter paths of two NPN transistors 20 and 21 respectively, to T−and thus to the collectors of transistors B′ and B. The collector of transistor 15 is connected not only to L− through a resistor 23, but also through a resistor 24 to the base of transistor B′. A result of these arrangements (here assuming transistors 20 and 21 to be conductive) is to place transistor 15 in latching relationship to transistors B′ and B; accordingly the above-described initiation of control-means energization (which among other things will render 20 and 21 conductive) will result in transistors B′, B and 15 latching in the conductive state, and in the sustainment of a voltage drop across resistor 23 which will have appeared promptly upon the closure of the switch W.

Between the 6—7 junction and conductor L− there may be connected the collector-emitter path of an NPN transistor 30, to whose base there may be connected, from the 23—24 junction, a series circuit comprising diode 31 and resistors 33 and 35; there may be connected from the 31—33 junction to L− a resistor 32 and from the 33—35 junction to L− a capacitor 34, and the base of 30 may be bypassed to L− through a small capacitor 36. The voltage which will have appeared across resistor 23 on switch closure will have resulted, before the reopening of the switch, in the charging of capacitor 34 through 31 and 33 and the rendering conductive of transistor 30, whereupon the current which originally flowed through diode 7 and the emitter-collector path of transistor 5 (and which upon switch closure became diverted through the diode 28) will remain diverted, but now through the collector-emitter path of 30. Transistor 5, A' and A will accordingly remain nonconductive, after the reopening of switch W, until there occurs a suspension of the voltage drop across resistor 23 for a long enough interval to permit a substantial discharge of capacitor 34. And of course while that drop persists base current will be supplied to transistor B' through resistor 24, thereby holding transistors B' and B in the conductive state.

Before further describing the control means M the signal generator G may be described. It may comprise an NPN transistor 120 whose emitter is connected to T–, whose base is connected through a capacitor 118 and through a diode 19 to the collector of transistor 20, and whose collector is connected through a capacitor 117 to the base of transistor 20; resistors 113, 114, 115 and 116 may be connected from conductor U to the collector of 120, the base of 20, the base of 120 and the 118—19 junction, respectively. The collector-emitter path of an NPN transistor 121 may be connected from the base of 120 to T–. While the control means is energized, then so long as transistor 121 is kept conductive the transistor 120 will be nonconductive, current will flow through resistor 114 and the base-emitter path of transistor 20 (here assuming transistor 21 to be conductive, which it is until the conclusion of the dialing period) to keep transistor 20 conductive, the capacitor 118 will stand essentially discharged, and the capacitor 117 will stand charged (right-hand plate positive). Upon a rendering nonconductive of transistor 121, however, base current will flow to transistor 120 through resistor 115 thereby rendering 120 conductive and, by reason of charged capacitor 117, driving negative the base of 20 and thereby rendering the latter nonconductive. This action constitutes the beginning of a multivibrator action between transistors 20 and 120, in which transistor 20 will be rendered alternately nonconductive and conductive by transistor 120 being alternately conductive and nonconductive. The values of the capacitors and resistors in the signal generator G may be chosen to make the length of each whole cycle of the action just described approximately 100 milliseconds and to fix the duration of each span of conductivity of transistor 120 at approximately 60 milliseconds. The multivibrator action will of course be terminated forthwith upon the re-establishment of conductivity of transistor 121.

Reverting to the control means M, that means includes a timer V, energized from conductor U and terminal T–, whose action may be started by the application of a positive impulse to its input terminal 48; the timer may have an output terminal 49 whose potential is normally that of T–, which at the beginning of operation of the timer rises to essentially that of conductor U, and which at the conclusion of the timing interval falls again to that of T–. The onset of energization of the control means M may be cause to apply such a positive impulse to terminal 48 by the connection from conductor U to terminal T–of a differentiating serially comprising a capacitor 41 and a resistor 42 (the latter preferably shunted by a reversely poled diode 43), and the connection of the 41—42 junction to the terminal 48 through a diode 44.

The control means in its upper-shown portion includes an electronic stepping switch SS which may be energized from conductor U and terminal T–, and which may have output terminals, designated 131 through 138, equal in number to the maximum number of digits of any telephone address to be dialed; the function of the stepping switch is sequentially to render positive (with respect to T–) those output terminals one at a time. The stepping switch may have a "set" terminal 129 to which the application of a positive impulse will result in the first output terminal 131 being rendered positive, and an "advance" terminal 130 to which the application of a positive impulse will advance the stepping switch in each instance to instead render positive the next higher-numbered terminal and, in the instance of advance when the last output terminal has been positive, to place the stepping switch out of operation.

The control means in the same portion includes an electronic pulse counter PC which may be energized from conductor U and terminal T–, and which may have output terminals, designated 171 through 180, respectively representing the numerals 1 through 10; the function of the pulse counter is sequentially to render positive (with respect to T–) those output terminals one at a time. The pulse counter may have a set terminal 169 and an advance terminal 170, which for the pulse counter perform, respectively, functions quite analogous to those above described for terminals 129 and 130 of the stepping switch—excepting that the pulse counter's first output terminal 171 will not be rendered positive until positive impulses have been sequentially applied first to the set terminal 169 and thereafter to the advance terminal 170.

The output terminals 131 through 138 of the stepping switch may be connected through respective resistors 141 through 148 to the bases of respective NPN transistors 151 through 158. The emitters of all eight of these transistors may in common be connected to T– first through serially arranged resistors 66 and 67 and, secondly, through a serially arranged diode 45 and resistor 46—the 45—46 junction being connected through a capacitor 47 to the timer's input terminal 48. The collectors of the transistors 151 through 158 may be connected to respective terminals 161 through 168.

Each of the terminals 161 through 168, which are respectively identified with the eight digits of a telephone address to be dialed, may be connected to that one of the pulse-counter output terminals 171 through 180 which represents the numeral of which that digit consists—the connections arbitrarily illustrated in FIG. 2 being appropriate to the dialing of the telephone address "93465002."

Both the stepping switch SS and the pulse counter PC are set as an incident to the energization of the control means. Such setting of SS (which will render its first output terminal 131 positive) may be arranged for by the connection of a diode 128 between the 41—42 junction and the set terminal 129; such setting of PC (which will not yet render its first output terminal 171 positive) may be arranged for by connecting the timer's output terminal 49—above-mentioned as rising at the onset of control-means energization—to the set terminal 169 through a diode 51 and a resistor 52. (It may be mentioned that the positive impulses applied to the set terminals 129 and 169 as an incident to the onset of control-means energization are accompanied by the application of positive impulses to the respective advance terminals 130 and 170 through elements yet to be described—but the latter impulses are at this time precluded from accomplishing any advancing by the fact that they occur during, and are completed before the ends of, the former).

The output terminal 49 of the timer may be connected through a resistor 53 to the base of transistor 121 in the signal generator, so that during the timing intervals that transistor will have been held conductive and the signal generator G therefore out of operation. At the conclusion of the timing interval, however, the fall of terminal 49 potential will result in the signal generator becoming operative and remaining operative until the timer is next restarted (or the control means deenergized).

It has already been noted that the operation of the signal generator G will drive transistor 20 nonconductive for successive time spans of about 60 milliseconds separated by intervals of about 40 milliseconds of resumed conductivity. Those spans of nonconductivity of that transistor constitute generated signals. During each of them there is cut off the flow of base current to transistors B' and B; the resulting temporary nonconductivity of B temporarily removes the terminals T+ and T– from any effective connection across the telephone line, and thus removes from the line the substitute loading imposed by those terminals. Meanwhile during each of the signals any loading of the line by the station S remains removed by reason of the continued nonconductivity of transistors A′ and A, resulting from the continuance of conductivity of transistor 30 occasioned by the flow to its base of discharge current from capacitor 34; the deloading recurrently effected by the transistor B accordingly serves to impress the signals on the telephone line.

It is to be noted that although during each signal the terminals T+ and T− have been removed from effective connection across the telephone line, nevertheless the control-means energization is continued throughout the signal by energy then released to those terminals from the capacitor P. During this release the potential across the capacitor will of course progressively diminish from its normal value of the breakdown potential of the Zener diode Z (typically about 10 volts)—but with appropriate values of the components of the control means and a sufficient value of the capacitor P this diminution will not progress to as low as the breakdown potential of the regulating Zener diode 13 (typically about 7 ½ volts). Accordingly there will be no appreciable diminution of the voltage between conductor U and terminal T−, and no interference with the control-means energization, during each signal.

The above-mentioned path through which the emitter of transistor 15 is connected to conductor U includes not only conductor 16 but also the emitter-base path (shunted by a resistor 59) of a PNP transistor 60, which accordingly is conductive only when transistor 15 is conductive. The collector of 60 may be connected to T− through a resistor 61, and through a path serially formed by a capacitor 62 and a resistor 63; the 62—63 junction may be connected to the pulse counter's advance terminal 170 through a diode 64. While the transistors 20, 15 and 60 are nonconductive the capacitor 62 will be in a discharged state—but when they resume conductivity at the end of each signal that capacitor will charge abruptly through diode 64, applying a positive impulse to the advance terminal 170 and thereby advancing the pulse counter. The effect of the advance effected at the end of the first signal will be to render positive the output terminal 171, of that at the end of the second signal to render positive terminal 172, etc.

When there is rendered positive the pulse-counter output terminal to which terminal 161 is connected—as shown in FIG. 2, when output terminal 179 is rendered positive—there will be established a source of collector current for transistor 151. By reason of the positive potential of the stepping switch output terminal 131 which became established when the stepping switch was set, a small base current will already be flowing in that transistor. Accordingly upon the above-mentioned establishment of a collector-current source collector current will flow in the transistor 151, resulting in a substantial flow of current through diode 45 and a substantial rise of potential at the top of resistor 46; through capacitor 47 this rise will be applied as a positive impulse to the timer's input terminal 48, starting a reoperation of the timer and stopping the operation of the signal generator G. With the illustrated connection of 161 to 179 this will occur at the conclusion of a train of nine signals. The start of timer reoperation will of course again result in the setting of the pulse counter through diode 51 and resistor 52; the output terminal 179 will lose its positive potential, and the collector-current flow in transistor 151 will have been limited to a short impulse only.

It is arranged that at the beginning of each reoperation of the timer the stepping switch SS will be advanced by the application of a positive impulse to its advance terminal 130. To accomplish this the timer's output terminal 49 may be connected to T− through a serially arranged diode 54 and a resistor 55, and between the 54—55 junction and that advance terminal there may be serially connected a capacitor 56 and a diode 57 (the latter preferably shunted by a resistor 58). Accordingly when the timer first began reoperation the output terminal 132 will have been rendered conductive (and terminal 131 nonconductive).

At the conclusion of the reoperation of the timer the signal generator G will again be rendered operative, and there will be reinitiated the actions described in the last preceding several paragraphs—excepting that this time the number of signals in the generated train will be determined by the pulse-counter output terminal to which terminal 162 stands connected, which in the illustrated case will be three. When a train of that number of signals has been generated another reoperation of the timer will be started, and the operation of the signal generator will again be stopped. And the described actions will successively recur, resulting in the generation of third, fourth, fifth, sixth, seventh and eighth trains of signals, of numbers respectively commanded by the choices of pulse-generator output terminals to which terminals 163, 164, 165, 166, 167 and 168 respectively stand connected.

Arrangements are provided for terminating the energization of the control means at the conclusion of the last signal train. These may include a PNP transistor 75 whose emitter is connected through resistors 73 and 71 to the final stepping switch terminal 138, a capacitor 72 being connected from the 73—71 junction to T−; thus transistor 75 can be furnished with emitter current only after the generation of all but the last train of signals—and then only with a slight delay imposed signalsthe time required for some charging of capacitor 72 from terminal 138 through resistor 71. The emitter-base path of 75 may be shunted by a resistor 74, and the base of 75 may be connected through a resistor 76 to the collector of an NPN transistor 70; the emitter of 70 (whose base-emitter path may be shunted by a resistor 69) is connected to T−. Transistor 70 may be rendered briefly conductive at the conclusion of each train of signals (i.e. each time collector current impulsively flows in one of the transistors 151—158); this may be arranged for by connecting the base of 70 to the 66—67 junction through a diode 68. The net effect of this circuitry is to achieve a momentary flow of base current in transistor 75 when and only when the normal span of the last signal of the eighth train has been completed.

From terminal T+ to terminal T− there may be serially connected a small-valued resistor 81 and the anode-cathode path of an SCR 80; the gate of 80, connected and bypassed to T− through a resistor 79 and a capacitor 78 respectively, may be connected to the collector of transistor 75. The momentary flow of base current in transistor 75 just mentioned will of course be accompanied by a momentary flow of collector current in that transistor, and a consequent triggering of the SCR into conduction—with the effect of forthwith starting a rapid discharge of the capacitor P through the resistor 81 and the SCR.

Of course coincidentally with the triggering of the SCR a restarting impulse is applied to the timer, whereupon transistor 121 forthwith renders transistor 120 nonconductive and transistor 20 therefore conductive, and this sets up the conditions for a resumption of conductivity by transistor 15, B′ and B. Such a resumption does occur—but a means is provided to limit it to a duration of microseconds only. Such means comprises the transistor 21, which during the control-means energization up to this point has been maintained steadily conductive by the flow of current to its base through a resistor 82 connected from the lower end of resistor 81 to that base—but which forthwith upon the triggering of the SCR becomes thereby deprived of base current, in turn depriving transistors 15, B′ and B of base currents and thereby rendering them nonconductive. Their thus-enforced nonconductivity necessarily persists so long as SCR 80 remains conductive, which it of course does until the capacitor P is essentially discharged—prior to which time the voltage between T+ and T− will have fallen to far less than required to sustain any energization of the control means. Thus, except for a transient period measured in microseconds and of no significance as far as the telephone line is concerned, the connection of the terminals T+ and T− across that line and the loading of that line thereby are effectively terminated at the end of the normal span of the last signal in the final train of signals.

The failure of 15, B′ and B to resume conductivity (other than transiently as just mentioned) at the end of the normal span of the last signal results in the duration of that signal, as sensed by the telephone line, being extended until capacitor 34 has been substantially discharged through resistor 35 and the base-emitter path of transistor 30, thereby to permit that transistor to become nonconductive and transistors A' and A to resume conductivity and to reimpose on the line a loading by the station S. This for reasons above brought out must take appreciably longer than 60 milliseconds; it is, however, unobjectionable—because in pulse dialing the last signal of a train may be permitted to be of very substantially longer duration than that to which each of its predecessors is required to be limited.

Whatever the number of digits for which the apparatus is arranged, there may be instances of use for which the dialing of a lesser number only is desired; arrangements may be included to adapt the apparatus to such instances. They may comprise a PNP transistor 85 whose emitter is connected to conductor U, whose emitter-base path is shunted by a resistor 84 and a small capacitor 83, and whose collector is connected through a resistor 86 to the gate of SCR 80; the base of transistor 85 may be connected to a "muting" terminal 88. To that muting terminal there may be connected that one of the terminals 161—168 which is identified with the digit immediately succeeding the last one whose dialing is desired—e.g. if there be desired the dialing of three digits only, then terminal 164 would be connected to the muting terminal 88. In such case, upon the advancement of the stepping switch to render positive its output terminal 134—occurring at the conclusion of the third (in this instance, the desired final) train of signals—not only will base-current flow be established in transistor 154 but also collector current for that transistor will forthwith be drawn through the emitter-base path of transistor 85. This will of course be accompanied by the flow of collector current in transistor 85, which will forthwith trigger the SCR 80 into conduction—to result, at the conclusion of the earlier (e.g. third) digit, in precisely the same actions as those which in usual case are evoked by the transistor 75 at the end of the eighth digit.

For its simplest function of providing interdigit separations of the timer V may have a timing interval of the typical order of 0.7 second; there may, however, be particular digits preceding which a longer interval is useful. For example, if the timer were to provide a few-second delay prior to the first digit, then the apparatus could be actuated forthwith upon the removal of the handset from the hook switch—reliance then being placed on the appearance of dial tone during that delay and thus prior to the generation of the first-digit dialing signal. Again for example, if the first digit be used as an "access" digit (e.g. affording access from a private-exchange phone to the public system) a few-second delay prior to the second digit is desirable to allow time between the first and second digits for the certain completion of the access.

For such purposes the timer may be provided with an interval-variation terminal 50, and may be made to operate with a timing interval dependent on the sum of the value of the internal timing resistor and that of any resistance present (externally to the timer) between that terminal and T——that interval for example being at a minimum if that resistance be zero or be merely an appropriately conductive semiconductor path. In FIG. 2 the PNP transistor 90, whose collector-emitter path is connected between terminal 50 and T−, is normally rendered conductive by the flow of current to its base through a resistor 92 connected between that base and the conductor U, and when conductive establishes the timing interval of V at its minimum value mentioned above. Also connected between 50 and T−, however, is a resistor 91 which will become the interval-lengthening external resistance when and for so long as the transistor 90 may be rendered nonconductive; resistor 91 may for example be appropriate to a lengthening of the timing interval to a few seconds.

To render the transistor 90 nonconductive when desired there may be connected across its base-emitter path the collector-emitter path of an NPN transistor 95; the base-emitter path of 95 may be shunted by a resistor 94, and a resistor 96 may be connected between its base and a control conductor 100 which will be rendered positive whenever it is desired that resistor 91 be effective to establish the longer timing interval. In FIG. 2 there is shown between the stepping switch output terminal 131 and the conductor 100 a diode 101 which will render that conductor positive during the timer's operation immediately preceding the first digit, thereby typically to provide for a few-second interval to allow for the appearance of dial tone; there is also shown between the output terminal 132 and the conductor 100 a diode 102 which will render that conductor positive during the timer's operation immediately preceding the second digit, thereby typically to provide for a few-second interval to insure the completion of an access commanded by the first digit.

A typical timer V is illustrated in FIG. 3. It may comprise a PNP transistor 200 whose emitter is connected to the positive terminal of the timer and whose collector is connected (a) to the output terminal 49, (b) through a resistor 199 to the negative terminal, and (c) through a diode 201 and a timing capacitor 202 and an interval-determining resistor 203 to the interval-variation terminal 50 (which for the minimum timing interval will be externally connected to the negative terminal of the timer). From the 201—202 junction to the negative terminal there may be connected a resistor 198, and from the 202—203 junction—which may be termed the timing junction J—to that terminal a reversely poled diode 197.

Between the positive and negative terminals of the timer there may be connected a voltage divider serially comprising upper resistor 187, diode 188 and lower resistor 189. To the 188—189 junction there may be connected the emitter of an NPN transistor 185 and the collector of a PNP transistor 190, the collector of 185 being connected to the base of 190 and the emitter-base path of 190 being shunted by a resistor 191; the emitter of 190 may be connected to the base of transistor 200 through a resistor 192, and from the positive terminal to the base of 200 there may be connected a resistor 194 bypassed by a small capacitor 193. From the base of transistor 185 to the input terminal of the timer there may be connected a resistor 183, and from that input terminal to the timing junction J a resistor 184. The normal potential of the base of transistor 185 may be established at a little less than that of the emitter of that transistor by a diode 186 and a resistor 182 serially connected from the 187—188 junction to the input terminal 48.

Normally the transistor 185 and therefore the transistors 190 and 200 will be nonconductive, the timing capacitor 202 will be discharged and the output terminal 49 will be at the potential of the negative terminal. The application of a positive impulse to the input terminal 48, however, will briefly drive the transistor 185 and thus the transistors 190 and 200 into conductivity, abruptly raising the potentials of both plates of the timing capacitor 202 and thus abruptly raising the potential of the timing junction J, whereupon the timing capacitor 202 will begin to charge.

The charging of capacitor 202 will occur partially through resistors 184—183, the base-emitter path of 185 and the resistor 189, but the posture of 189 in the emitter circuit of transistor 185 results in its effective value for this purpose being tremendously greater than its actual value (an effect which is still further magnified by the transistor 190), and this sharply limits the rate of such charging; that rate will, however, be sufficient to maintain transistors 185, 190 and 200 conductive. The vast preponderance of the charging will occur through the internal timing resistor 203 (and the external timing resistor, 91 of FIG. 2, if that be not effectively shorted by transistor 90). The charging of timing capacitor 202 will persist until the potential of the timing junction J has dropped to substantially that of the 188—189 junction—whereupon flow of current in the base-emitter path of 185 will cease, that transistor together with 190 and 200 will become nonconductive, and the timing interval will have been completed. Thereupon the potential of the output terminal 49 will abruptly drop (the timing capacitor rapidly discharging through the resistor 198 and the diode 197).

FIG. 4 is a schematic diagram of a typical station S. It may comprise an induction coil 210 having three DC-carrying windings 211, 212 and 213 (typically essentially similar to each other) connected in series with each other but with a varistor 215 interposed between 211 and 212. Across those three windings and that varistor (i.e. from the upper extremity of 211 to the lower extremity of 213) there is connected a circuit serially comprising a resistor 217 and a varistor 216 (of higher resistance than 215)—the elements thus described forming a network N which, when connected across the telephone line, imposes on that line a DC loading. As employed in FIG. 2 the station S may typically be connected across the line by the connection of the lower extremity of 213 to the conductor L− through one side of the hook switch H and the paralleled transistor A and diode 3, and by the connection of the upper extremity of 211 to the conductor L+ through the other side of the hook switch—and through the usual normally closed but dial-operated contacts 218, a capacitor 219 being shunted across the series combination of those contacts and the resistor 217. The telephone transmitter 220, in series with a resistor 221, is typically connected across the series combination of varistor 215 and the coil 212.

Elements of the station S which do not contribute to the DC loading of the line are a winding 214 included in the induction coil 210 and, across that winding, the serial combination of a varistor 226 and a resistor 228; the telephone receiver 225 is typically connected across the varistor 226. The 226—228 junction is connected to the 211—215 junction and, through a capacitor 227, to the 215—212 junction; the 214—228 junction is connected to the 215—212 junction through a capacitor 229.

FIGS. 2 through 4 have thus served to present typical detailed circuitry for the pulse-dialing embodiment which was illustrated in simple form in FIG. 1—with the exception only of typical internal circuitries for the stepping switch SS and pulse counter PC which, being already well known in the art, need not herein be shown.

Figure 5:
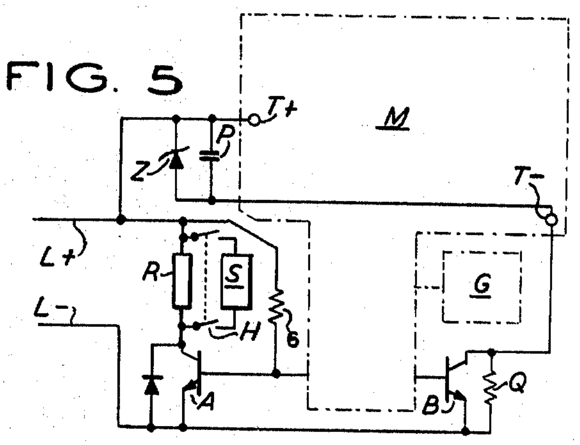
FIG. 5 is a simplified schematic diagram of a modification of FIG. 1.

Before leaving the area of pulse dialing it may be noted that an optional variation or addition may be employed in respect of the means (in FIGS. 1 and 2, the capacitor P) which during the signals supplies to the terminals T+ and T− supplementary energy derived from the line. This, illustrated in FIG. 5 (which is otherwise a representation of FIG. 1) comprises a resistor Q in shunt to the collector-emitter path of transistor B.

The resistor Q must be of substantial value—more specifically, must be of value sufficient to limit the current through it during the signals (when the line voltage is relatively high) to at most a very few milliamperes, so that it will not impair the deloading of the line (of which in effect the signals consist) sufficiently to cause the central office equipment to fail to detect the signals. Employed within that limitation, it functions during the signals as a means for then supplying to the terminals T+ and T− supplementary energy derived from the line—which is a function performed in a different manner by the capacitor P—and it accordingly permits a reduction of the permissible size of the capacitor P (or even, with a control means M of sufficiently low energizing current demand, the elimination of that capacitor).

Note is made that in FIG. 2 the use of a relatively high-voltage protective Zener diode 2 is desirable both because of the relatively high value (e.g. much greater than 50 volts) to which the line voltage rises transiently at the beginning of each signal, and because of the passage from the line to beyond that Zener diode of the relatively high-voltage alternating ringing currents. It follows that in that figure the various transistors which are exposed to voltages not regulated by the much lower-voltage Zener diode Z are desirably of a variety capable of withstanding relatively high voltage. It is in turn because of the greater difficulty in achieving high gain with such transistors that there is preferred the use of the driver transistors A′ and B′, which are not necessary if the gains of A and B be sufficiently high.

Figure 6:
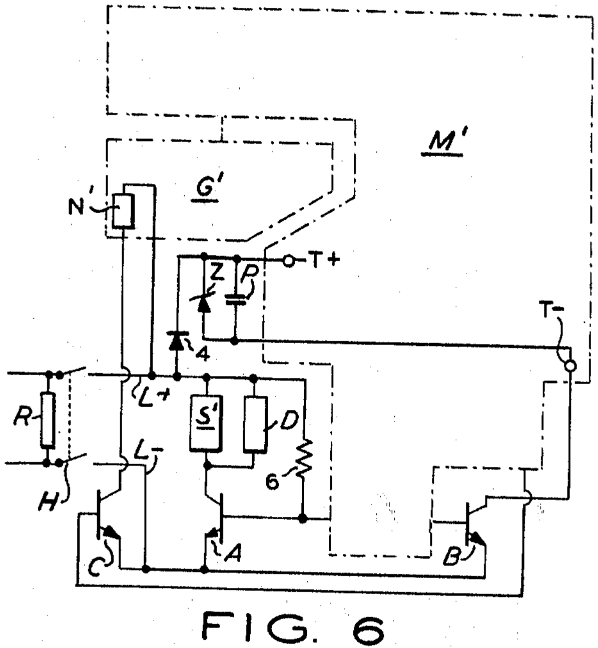
FIG. 6 is a simplified schematic diagram of an embodiment of the invention for tone dialing.

FIG. 6 is a simplified schematic diagram of an embodiment of my invention for tone dialing, specifically tone dialing of the dual-frequency so-called "Touch-Tone" variety. Therein L+ and L− again denote the telephone line, and S′ denotes a telephone station of the usual tone-dialing variety, including the usual station network (e.g. as shown in FIG. 4, excepting that the contacts 218 and capacitor 219 may be omitted) and handset; the pushbutton assembly and tone oscillator are shown adjacently but separately as touch dialer D. In this case the ringer R and hook switch H are shown connected directly across the incoming line, so that it is only the station S and touch dialer D whose connection to L− is through transistor A. G′ denotes a signal generator of the dual-frequency type, including a substitute station network N′ by which it may be coupled to the line, and M′ denotes an electrically energizable control means with which the signal generator is connected and which is actuable to direct the operation of the signal generator. As in the case of FIGS. 1 and 2, the control means is provided with a pair of energy-input terminals T+ and T−, and is energized by the supply of energy to those terminals; T+ is connected—(in FIG. 6, directly)—to L+, and T− is connected to L− through the switching transistor B. One of the terminals of the substitute station network N′ may be connected—(in FIG. 6, directly—to L+, and its other terminal may be connected to L− through a switching transistor C. While the hook switch is closed—excepting during the dialing period—transistor A is conductive and transistors B and C are nonconductive.

As in FIGS. 1 and 2, the control means renders the transistor A nonconductive during the dialing period, and it renders the transistor B conductive during the nonsignal intervals of that period; the control means further renders the transistor C conductive during the signals themselves. Thus again the transistor A acts during the dialing period to free the line of loading by the station network comprised within the station S, but in this case transistor C acts to impose on the line a loading by the station network N′ during the signals—so that in this case the line is freed of station-network loading only during the nonsignal intervals. Transistor B of course again constitutes means effecting a low-resistance current-conducting connection of the energy-input terminals T+ and T− across the line during those nonsignal intervals. Again the capacitor P and the Zener diode Z are present to perform functions respectively analogous to those which they performed in FIGS. 1 and 2.

Distinctions from the FIG. 1—2 case comprise the above-mentioned presence of station-network loading during the signals, and a resulting failure of the line voltage to rise during the signals to a relatively high value. Neither of those distinctions interferes with the beneficial action, during the nonsignal intervals, of the line being freed of station-network loading and of its therefore then reliably having an ample voltage for the energization of the control means; the absence of line-voltage rise during the signals does, however, render desirable the insertion of a diode 4 in the current-conducting path to the terminal T+. Another distinction is that in view of the altered position of the hook switch H there is no longer provided any conductivity of transistor A while that switch is open—but none is needed in view of the altered position of the ringer R, which also dispenses with the need for the diode 3 of FIG. 1.

Figure 7:
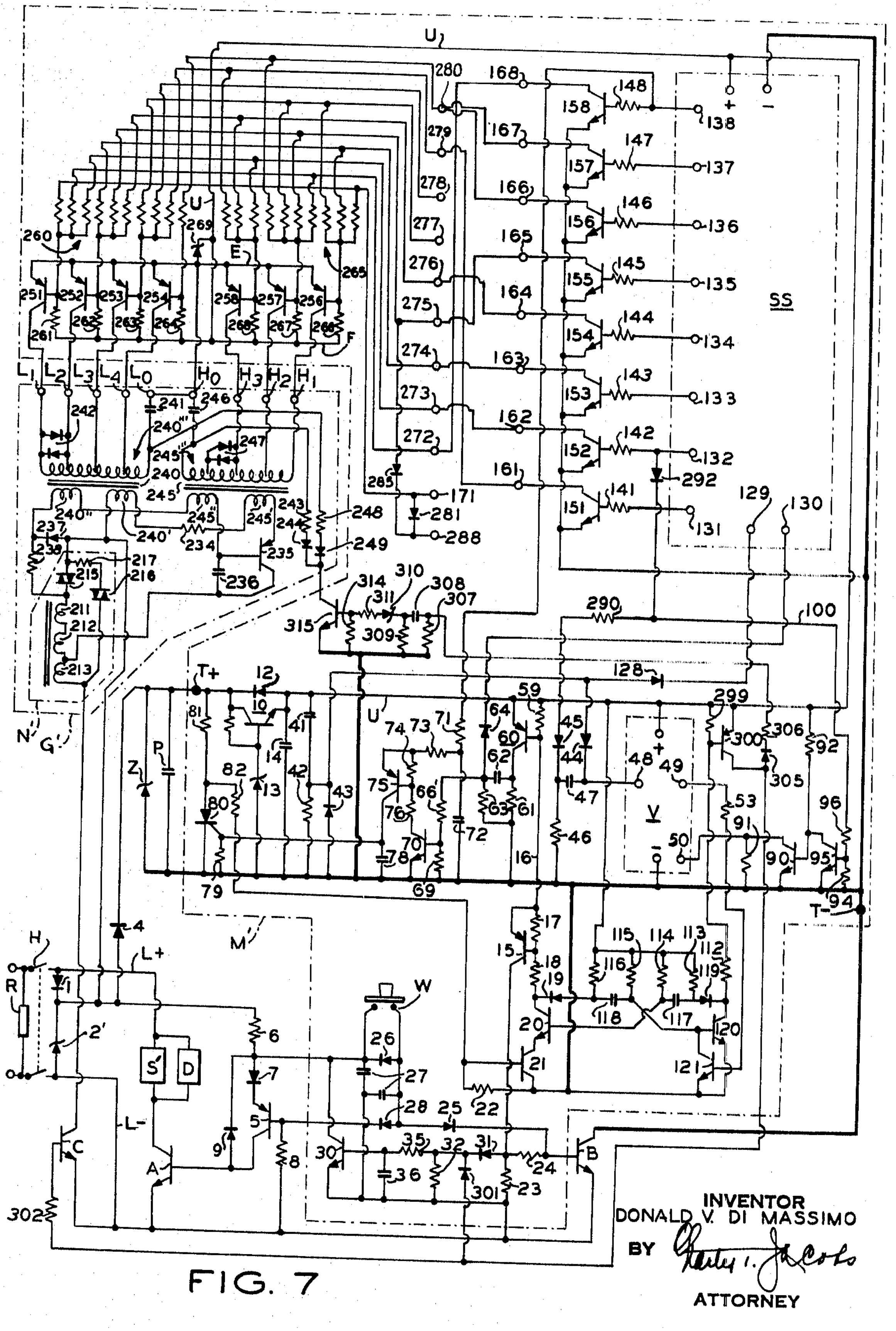
FIG. 7 is a more complete diagram of the apparatus of FIG. 6.

FIG. 7 is a more complete circuit diagram of the apparatus of FIG. 6. As in FIG. 2, the connection of terminal T+ (and of resistor 6) to conductor L+ is made through diode 1, and a protective Zener diode 2′ may be connected from the cathode of diode 1 to conductor L−. In this case, however, neither high line voltage during signals nor high-voltage ringing currents need be considered, and accordingly 2′ may be of a modest breakdown voltage such as 20 volts; further, there may be omitted the driver transistors A′ and B′ of FIG. 2—and none of the transistors of FIG. 7 need be capable of withstanding more than modest voltage.

In describing the signal generator G′ of FIG. 7 it is convenient first to note the included station network N′, of which the upper-shown extremity may be connected to the cathode of diode 1 (i.e. to the line conductor L+ through that diode);

the network N′ may be similar to the network N shown within FIG. 4, excepting that as a matter of convenience the positions of winding 211 and varistor 215 may be interchanged to bring the latter adjacent to the upper-shown extremity. From that network extremity to the 215—211 junction there may be serially connected a silicon diode 237 and a resistor 238 as a result of which, when the network N′ is connected across the telephone line, normal diode drop will appear across 237.

The signal generator G′ may further comprise a low frequency transformer 240 and a high frequency transformer 245, each having primary, secondary and tertiary windings. The primary windings 240′ and 245′, in series with each other and with a resistor 234, may be connected between the emitter of a PNP transistor 235 and the anode of the diode 237; the secondary windings 240″ and 245″ in series with each other may be connected from the base of 235 to the cathode of that diode. A capacitor 236 may be connected from the base to the collector of 235, and that collector may be connected to the 212—213 junction. These connections serve to create a dual-frequency oscillator and, when the network N′ is connected across the telephone line, to provide the transistor 235 with base and collector bias.

Tunings of the oscillator are accomplished in the circuits of the tertiaries 240‴ and 245‴ of the transformers 240 and 245 respectively. One extremity of tertiary 240‴ may be connected through a tuning capacitor 241 to a terminal L0; that tertiary may be provided with three taps, and those taps and the other extremity may be respectively connected to terminals L4, L3, L2 and L1—a pair of oppositely poled diodes 242 being connected between L1 and L2. Correspondingly one extremity of tertiary 245‴ may be connected through a tuning capacitor 246 to a terminal H0; that tertiary may be provided with three taps, and the second and third of those taps and the other extremity may be respectively connected to terminals H3, H2 and H1—a pair of oppositely poled diodes 247 being connected between the first and second of those taps. Tuning of the oscillator to two frequencies simultaneously will be accomplished by appropriate connection of L0 to one of L1, L2, L3 and L4, and of H0 to one of H1, H2 and H3.

Attention may now be directed to the control means M′, whose function it is to direct the operation of the signal generator G′. In many respects—but by no means all—the control means M′ is similar to the control means M of FIG. 2; accordingly, for conservation of description, it will be described with primary emphasis on the points of difference of it and its operation from those of FIG. 2.

It may at first be observed that the circuitry which constituted the signal generator G of FIG. 2 becomes merged into the control means M′—its function now being no longer to generate signals but rather, and simply, to space the successive signals each from its predecessor. No change in the multivibrator circuitry is required,—other than the feed of current to the collector of transistor 120 through a separate resistor 112, and the interposition between that collector and the 117—113 junction of a diode 119; this separate feed permits the interposition between the resistor 112 and the conductor U (from which the feed takes place) of the emitter-base path of a PNP transistor 300, shunted by a resistor 299. Transistor 300 will of course be conductive when and only when transistor 120 is conductive—i.e. during the signals—and accordingly the above-mentioned conductivity of transistor C during the signals may be provided for by the connection of the base of C through a resistor 302 to the collector of 300.

It is desirable to shift slightly the values of the components of the multivibrator so as to result, when it is operating, in the spans of alternate conductivity of transistors 120 and 20 being each of approximately 50 milliseconds duration.

Advantage may be taken of the presence of transistor 300, conductive during and only during the signals, to eliminate the delaying resistor 33 and capacitor 34 of FIG. 2. The collector of 300 may be connected through a diode 301 to the 31—32 junction—with the result that at any time during the dialing period the transistor 30 will be being held conductive (and the transistor A therefore nonconductive) either through the diode 31 or through the diode 301.

Provided as before are the regulator 10—11—12—13, the differentiating circuit 41—42—43, the timer V and the stepping switch SS. As before, positive impulses will be supplied at the beginning of control-means energization both to the timer's input terminal 48 to start the timer, and to the stepping switch's set terminal 129 to result in its first output terminal 131 becoming positive. As before the timer will, through the transistor 121, hold out of operation the multivibrator constituted by transistors 20 and 120 and their associated circuitry; at the conclusion of the first timing interval, however, the multivibrator will be freed for operation. During the first cycle of its operation there will continue the positive potential of the stepping switch first output terminal 131 which prevailed throughout the initial timing interval. At the conclusion of that, or of any subsequent, cycle the charging of capacitor 62 incident to the resumption of conductivity by transistors 20 and 60 will result in the passage of a positive impulse through diode 64—whose cathode in FIG. 7 (unlike FIG. 2) is connected to the advance terminal 130 of the stepping switch—to result in the output terminal (e.g. 131) which last had positive potential losing it and the next higher-numbered one assuming such potential.

In FIG. 7 arrangements similar to those of FIG. 2 (made up of elements bearing numbers between 69 and 82, together with transistor 21 and resistor 22) may be used for terminating the energization of the control means—excepting that in this case the rendering briefly conductive of transistor 70 may be arranged for by connecting its base to the 62—64 junction through a resistor 66′. In this case those arrangements will be called into play when, at the conclusion of the cycle during which output terminal 138 has been positive, transistors 20 and 60 first resume conductivity. At that time (as at the conclusion of the normal span of the last signal of the eighth train in FIG. 2) transistors 70 and 75 will be rendered briefly conductive, the SCR 80 will be triggered into conduction, the capacitor P will begin a rapid discharge through the SCR, and the transistor 21 (and thus transistors 15 and B) will be rendered nonconductive, terminating the control-means energization. In this case the transistor A will resume conductivity forthwith (without the slight delay occasioned by the time required in FIG. 2 for the discharge of capacitor 34).

It will thus be understood that—subject to certain optional intradialing-period delays which may be provided for by diodes 101 and 292 and is hereinafter described—the period of energization of the control means M′ (i.e. the dialing period) will begin with a timing interval during which the first output terminal 131 is positive, will continue for eight cycles of operation of the multivibrator during which the output terminals 131 through 138 are successively positive, and will then be terminated. Thus the principal remnant for description is the circuitry which intervenes between those terminals on the one hand and the above-mentioned terminals L0 through L4 and H0 through H3 of the signal generator on the other.

The connections of L0 to one of the other L terminals and of H0 to one of the other H terminals, required for tuning of the oscillator to two frequencies, must of course be traversable by alternating currents. To accomplish such connections with the use of solid-state components recourse may be had to a bank of four transistors 251 through 254, and a bank of three transistors 256 through 258, each arranged for bidirectional conduction, using the emitter alternately as emitter and as collector and the collector alternately as collector and as emitter. Of each of these transistors (shown as PNP's) the emitter may be connected to a conductor E, and the base may be connected to a conductor F through a respective resistor (having an identifying numeral in each case higher by 10 than that of the transistor). The conductor U may be connected to the conductor F directly, and to the conductor E through a Zener diode 269 of relatively low (for example 3 volt) breakdown voltage. The collectors of 251, 252, 253 and 254 may be connected to the terminals L1, L2, L3 and L4 respectively, and the collectors of 256, 257 and 258 may be connected to the terminals H1, H2 and H3 respectively. The conductor E may be connected to the terminals L0 and H0. If now the base of any of the seven transistors 251—254 and 256—258 be connected also to negative potential through a resistor appropriately valued relative to the respective base-to-conductor F resistor, then that transistor will provide a bidirectionally conductive connection between the common L0—H0 and the L or H terminal to which that transistor's collector is connected.

A set of 10 terminals 271 through 280, respectively representing the numerals 1 through 10, may be provided. Each of those terminals may be connected to the base of one of the transistors 251 through 254 through a respective resistor, the 10 such resistors comprising the resistor bank 260; each of those terminals may also be connected to the base of one of the transistors 256 through 258 through another respective resistor, the 10 such other resistors comprising the resistor bank 265. The resistors just mentioned will be of such a value as is contemplated by the last sentence of the preceding paragraph. The selection of the transistors to whose bases the resistors in the bank 260 and those in the bank 265 are connected will of course be made in accordance with the code which is standard for the "Touch-Tone" dialing system and which, being well known, need not here be redetailed.

It will now be apparent that by effectively connecting any one of the terminals 271 through 280 to negative potential there will be achieved a tuning of the oscillator of the signal generator G′ to the respective pair of frequencies to which that terminal is appropriate. A series of desired such connections may be accomplished, under the control of the stepping switch's output terminals 131 through 138 (which again are identified respectively with the successive digits of a telephone address), by the use of the resistors 141 through 148, the transistors 151 through 158, and the terminals 161 through 168, of FIG. 2—excepting that in this case the emitters of those transistors will in common be connected to the terminal T−.

As before, that one of those transistors whose associated resistor is connected to a positive stepping-switch output terminal will be conductive, and in this case its collector will be placed effectively at T− potential. All that remains to be done between signal generator and stepping switch is to connect the several terminals 161 through 168 to ones of the terminals 271 through 280 appropriate to the desired telephone address; in FIG. 7 there are shown such connections appropriate to the same arbitrary address—"93465002—as in FIG. 2.

Although the oscillator is thus tuned to a respective pair of frequencies throughout the time during which some one of the stepping switch's output terminals is positive, nevertheless neither does the oscillator oscillate nor is it coupled to the line during the entirety of that time. It is only while the transistors 120, 300 and C are conductive—i.e. only during the first approximate half of each cycle of the multivibrator's action—that the network N′ of the signal generator G′ is connected across the line or that any voltages appear in the signal generator to energize its oscillator (or that the oscillator is coupled to the line). Thus it is only during those first half-cycles that the oscillator will function (or its output be transmitted), and it is this limitation which results in the provision of the required interdigit intervals—with which in this case the intervals between the successive signals are identical. As in FIG. 2 it is only during those intervals, and during the initial (and any later) operations of the timer, that the transistor B is conductive and effects a low-resistance current-conducting connection of the terminals T+ and T− across the telephone line; capacitor P functions as before, however, to maintain control-means energization during the signals themselves.

In order that the oscillator at the onset of each signal come promptly into full-amplitude oscillation it is highly desirable that it be shock-excited. To provide for such shock-excitation the terminals of the tertiaries 240‴ and 245‴ adjacent the respective tuning capacitors may be connected through respective resistors 243 and 248 and respective diodes 244 and 249 to the collector of an NPN transistor 315, of which the emitter is connected to T−. From the collector of transistor 300 to the base of 315 there may be serially connected a diode 305, a resistor 306, a capacitor 308, a Zener diode (of a few volts breakdown voltage) 310 and a resistor 311; resistors 307 and 309 may be connected from the 306—308 and 308—310 junctions, respectively, to T−, and a resistor 314 may shunt the base-emitter path of transistor 315. At each onset of conductivity of transistors 120 and 300—i.e. at the beginning of each first half-cycle of operation of the multivibrator—both plates of the normally discharged capacitor 308 will forthwith be raised in potential to almost that of the conductor U, the Zener diode will break down, and the transistor 315 will be rendered conductive; when the potential of the left-hand plate of the now-charging capacitor 308 has dropped to near the Zener breakdown voltage, however, the Zener diode 310 will abruptly cut off and the transistor 315 will abruptly become nonconductive. While conductive the transistor 315 will have been drawing current through the then-conductive ones of the transistors 251—254 and 256—258 and through some portion of each of the tertiaries 240‴ and 245‴; upon the abrupt termination of such conductivity those currents will be abruptly terminated, resulting in the desired shock excitations. The oscillation of the oscillator and thus the actual signal will begin upon that excitation.

Muting arrangements, to suppress the dialing of any digit or digits, may be provided in the apparatus of FIG. 7. In their simplest form these may comprise a muting terminal 288, to which through diode 281 there may be connected the output terminal 271 the lowering of whose potential will render conductive transistors 251 and 256, and to which through diode 285 there may be connected another output terminal—e.g. 275—the lowering of whose potential will render conductive two other transistors—e.g. 252 and 257—of the same groups respectively. The lowering of the potential of terminal 288 will now render simultaneously conductive transistors 251 and 252 thereby imposing an effective short circuit on the portion of the tertiary 240‴ intervening between L1 and L2, and will render simultaneously conductive transistors 256 and 257 thereby imposing an effective short circuit on the portion of the tertiary 245‴ intervening between H1 and H2. Such short circuits, by disabling the oscillator at both low and high frequency, will foreclose its operation for any digit whose respective one of the terminals 161 through 168 is connected to the muting terminal 288. (In distinction to the arrangement of FIG. 2, each digit to be muted requires the connection of its respective such terminal to the terminal 288.)

In the FIG. 7 system the timer V basically serves to provide a delay, after the onset of control-means energization, during which the capacitor P may initially charge. For the simple case of a series of tone signals each having normal time separation from its predecessor the timer is not reoperated, the interdigit intervals being in this case provided by the approximately 50-millisecond periods of nonconductivity of transistors 20 and B occurring normally in the operation of the multivibrator; in that simple case the timer may of course by of relatively simple design. As in the case of the FIG. 2 system, however, there may be particular digits before which there is useful a substantially longer interval; in such cases the timer V, then typically of such a form as is illustrated in FIG. 3, may be restarted when there becomes positive the stepping switch's output terminal for such a digit. FIG. 7 illustrates this, by way of example for the second digit, by a connection to the restarting diode 45 (which in FIG. 2 was otherwise connected to) of a circuit, from the output terminal 132, serially comprising diode 292 and resistor 290. If similar prefirst and presecond digit intervals be acceptable, the timer will be made to have the appropriate elongated interval and no further timing circuitry will be required; if, however, a longer presecond than prefirst digit interval be desired, then there may be employed the interval-variation arrangements of FIG. 2 designated by numerals from 91 through 100—the conductor 100 now being connected to the 292—290 junction.

With respect to the tone-dialing apparatus of FIG. 7 it may be noted that in a case wherein, by reason of high line resistance, the voltage of the line during the signals (e.g. when the line is loaded by the network N′) is less than the voltage to which the capacitor P has during the intervals been charged, the diode 4 alone (i.e. without the aid of transistor B, which might then be omitted by short-circuiting) would act to effect a low-resistance current-conducting connection of the terminals across the line during the intervals and only during the intervals. The inclusion of transistor B is, however, ordinarily preferred in order that the apparatus be adapted without change for lines of any resistance within the rather wide range (typically from 500 to 2,500 ohms) which in practice are considered acceptable.

It will of course be understood that in a wide variety of respects the embodiments of FIGS. 2 and 7 are purely typical. This is true not only as to circuitries by which various individual functions are performed, but of course also as to such matters as number of digits (eight in those embodiments) for whose dialing the apparatus is adapted, durations of signals and intervals, permanence or variability of programming (i.e. of connections of the terminals 161 through 168 to selected ones of 171—180 (and 88) or of 271—280 (and 288), and the like, as well as to the choice of the functional subdivisions of which the control means consists.

Figure 8:
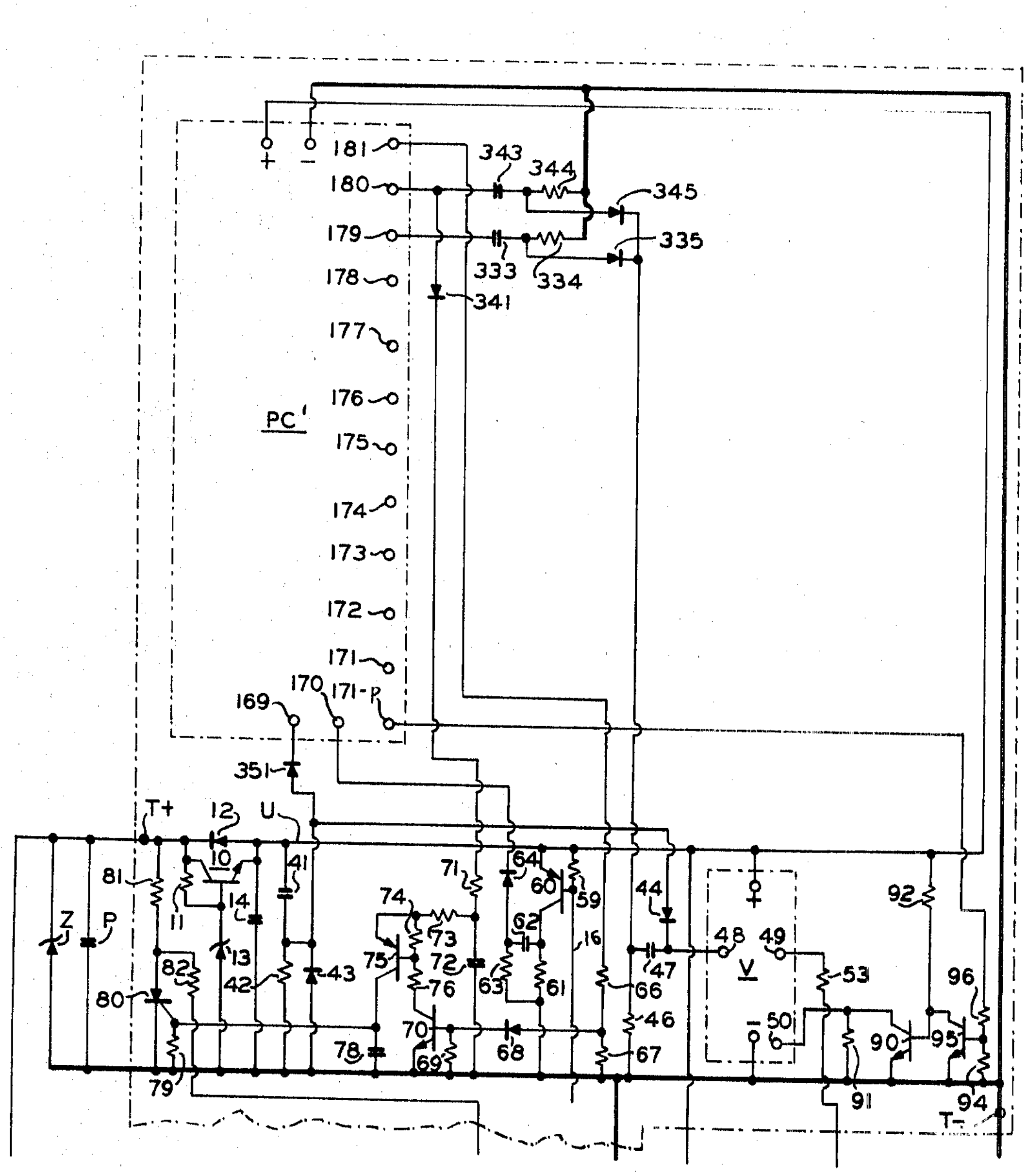
FIG. 8 is a diagram of a variation of the pulse-dialing apparatus of FIG. 2 for the dialing of an address requiring only a limited number of pulses.

Another tvnical pulse-dialing embodiment within the scope of the invention is illustrated in FIG. 8. This takes advantage of opportunities for economical simplification of the control means which are afforded when there is to be pulse-dialed only a predetermined address requiring only a limited total number of pulses—such as the address "911"now coming into increasing use for emergency calling, to which for illustrative purposes the illustration of FIG. 8 has been made specifically appropriate. The illustration of such simplification in FIG. 8 is not necessarily exhaustive, being presented within the limitation of minimum change, other than by way of omission, from the corresponding portion of FIG. 2.

The lower portion of FIG. 8 illustrates a group of elements corresponding to most, but not all, of the elements in the vertically-central portion of FIG. 2—and it is to be understood that with them there will be used as well the elements appearing in the bottom portion of FIG. 2, these having been omitted from FIG. 8 simply for economy of illustration. In its upper portion FIG. 8 wholly omits the stepping switch SS of FIG. 2; it still employs a pulse counter, PC′, which may be similar to PC of FIG. 2 excepting that it may include (a) an additional stage, with a respective output terminal 181, and (b) a "preliminary" output terminal 171–*p* which will be rendered positive forthwith upon the setting of the pulse counter and will so remain until the counter is first advanced (by the application of a positive impulse to advance terminal 170) to render positive the first output terminal 171. The transistors 151 through 158 of FIG. 2, together with the immediately associated resistors 141—148 and output terminals 161—168 are omitted. From the pulse counter's output terminal 179 to T− there may be connected a differentiating circuit comprising capacitor 333 and resistor 334, and from the output terminal 180 to T− there may be connected a differentiating circuit comprising capacitor 343 and resistor 344.

The 62—63 junction is connected through diode 64 to the pulse counter's advance terminal 170, as in FIG. 2. The other connections between lower and upper portions of FIG. 8 are as follows: the pulse counter's output terminal 180 is connected through a diode 341 to the upper extremity of resistor 71; the output terminal 181 is connected to the upper extremity of resistor 66; the 333—334 junction is connected through a diode 335, and the 343—344 junction through a diode 345, to the 46—47 junction; and the pulse counter's preliminary output terminal 171–*p* is connected to the upper extremity of resistor 96.

Operationwise (and without redescription of actions which are the same as in the case of FIG. 2), upon the control-means energization the pulse counter PC′ will be set by a positive impulse through the diode 351, whereupon its preliminary output terminal 171–*p* will be rendered positive to render the interval-lengthening resistor 91 effective for the initial interval of the timer V; after that elongated interval there will take place the generation of a train of nine signals, as in the case of FIG. 2. When the pulse counter's output terminal 179 goes positive at the end of the ninth signal a positive impulse will be applied through diode 335 and capacitor 47 to the timer's input terminal 48 to invoke a normal-interval reoperation of the timer, immediately following which there will take place the generation of a single signal. When the pulse-counter's output terminal 180 goes positive at the end of that single signal a positive impulse will be applied through diode 345 and capacitor 47 to the timer's input terminal to invoke another normal-interval reoperation of the timer, immediately following which there will take place the generation of another single signal; also when the terminal 180 goes positive the capacitor 72 will be charged, establishing for transistor 75 an emitter-current source which will persevere briefly after 180 loses and 181 assumes positive potential. When the terminal 181 goes positive at the end of the second single signal it will forthwith (through resistor 66 and diode 68) render conductive the transistor 70, causing a momentary flow of base and collector currents in transistor 75,—which results in the triggering of the SCR 80 and the termination of control-means energization, as in the case of FIG. 2—prior to which the address "911" will have been pulse-dialed.

While I have shown and described my invention in terms of particular embodiments thereof, it will be understood that I intend thereby no unnecessary limitations. Modifications in many respects will be suggested by my disclosure to those skilled in the art, and such modifications will not necessarily constitute departures from the spirit of the invention or from its scope, which I undertake to define in the following claims. In certain of those claims I refer to "preprogrammable apparatus," which for example in FIG. 2 may typically be taken as the apparatus shown in the enclosures M and G, other than switch W and the circuitry below that switch (i.e. 25—28, 30—36 and 23—24) —and which for example in FIG. 7 may typically be taken as the apparatus shown in the enclosures M′ and G′, other than switch W and the circuitry below that switch (i.e. 25—28, 30—32, 35—36 and 301).

I claim:

1. The combination, with a system comprising (a) preprogrammable apparatus, having a pair of terminals through which energy may be supplied to said apparatus to energize the same, effective when energized to generate a coded series of signals each preceded by a nonsignal interval, (b) means connected with said apparatus for causing an energization thereof, once effected, to persist for at least the duration of a signal, (c) a telephone line, and (d) circuit means for connecting said terminals across the telephone line, of (1) a normally nonconductive transistor having emitter, base and collector electrodes, the collector-emitter path of said transistor being serially included in said circuit means between one of said terminals and one side of the telephone line, (2) means, connected with said circuit means and controlled by said apparatus, effective upon the energization of said apparatus and until the conclusion of the ensuing series of signals to supply current to the base-emitter path of said transistor during the intervals preceding those signals but to open said circuit means during those signals, and (3) means for initiating an energization of said apparatus, comprising means independent of said apparatus for supplying a temporary initial current from the telephone line to said base-emitter path.

2. The subject matter claimed in claim 1 wherein said element identified as (2) comprises means, connected with said circuit means and controlled by said apparatus, effective upon the energization of said apparatus and until the conclusion of the ensuing series of signals to supply current to the base-emitter path of said transistor during the intervals preceding those signals but not during those signals.

3. The subject matter claimed in claim 1 further including a telephone station with which said system is associated and which includes a station network connected across said telephone line during communication from said station thereover, and means responsive to the operation of said element identified as (3) for disconnecting said station network from said telephone line until the conclusion of said series of signals.

4. The subject matter claimed in claim 1 further including a telephone station with which said system is associated and which during communication from said station loads said telephone line with a station network, and means responsive to the operation of said element identified as (3) for freeing said telephone line of station-network loading at least during the intervals preceding the signals of the ensuing series.

5. The subject matter claimed in claim 1 further including a telephone station with which said system is associated and which during communication from said station loads said telephone line with a station network, and means responsive to the operation of said element identified as (3) for freeing said telephone line of station-network loading until the conclusion of the ensuing series of signals.

6. The subject matter claimed in claim 1 further including a telephone station with which said system is associated and which during communication from said station loads said telephone line with a station network, and means responsive to the operation of said element identified as (3) for freeing said telephone line of station-network loading during the intervals preceding the signals of the ensuing series but not during those signals.